United States Patent
Ren et al.

(10) Patent No.: US 9,528,845 B2
(45) Date of Patent: Dec. 27, 2016

(54) OCCLUSION-REDUCED 3D ROUTING FOR 3D CITY MAPS

(71) Applicants: Liu Ren, Cupertino, CA (US); Lincan Zou, San Jose, CA (US)

(72) Inventors: Liu Ren, Cupertino, CA (US); Lincan Zou, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/836,387

(22) Filed: Aug. 26, 2015

(65) Prior Publication Data

US 2016/0061622 A1 Mar. 3, 2016

Related U.S. Application Data

(60) Provisional application No. 62/042,276, filed on Aug. 27, 2014.

(51) Int. Cl.
*G01C 21/36* (2006.01)

(52) U.S. Cl.
CPC .................................. *G01C 21/3638* (2013.01)

(58) Field of Classification Search
CPC .................................................. G01C 21/3638
See application file for complete search history.

(56) References Cited

U.S. PATENT DOCUMENTS

| 8,099,233 B2 | 1/2012 | Matsuno et al. |
| 8,260,543 B2 | 9/2012 | Han |
| 2004/0049341 A1 | 3/2004 | Fujiwara |
| 2005/0234638 A1 | 10/2005 | Ogaki et al. |
| 2006/0173615 A1 | 8/2006 | Pinkus et al. |
| 2011/0025531 A1 | 2/2011 | Geelen et al. |
| 2011/0106595 A1* | 5/2011 | Vande Velde .......... G06Q 30/02 705/14.4 |
| 2011/0130949 A1* | 6/2011 | Arrasvuori .......... G01C 21/3638 701/532 |
| 2011/0144909 A1* | 6/2011 | Ren .................... G01C 21/3638 701/455 |
| 2011/0166783 A1* | 7/2011 | Ren .................... G01C 21/3638 701/455 |

(Continued)

OTHER PUBLICATIONS

International Search Report and Written Opinion corresponding to PCT Application No. PCT/US2015/047096, mailed October 30, 2015 (10 pages).

*Primary Examiner* — Rodney Butler
(74) *Attorney, Agent, or Firm* — Maginot Moore & Beck LLP

(57) ABSTRACT

In one embodiment, a method for rendering a route in a 3D virtual environment includes generating with a processor a 3D virtual environment including a plurality of 3D objects, the 3D virtual environment corresponding to a physical region, identifying with the processor a route for navigation through the 3D virtual environment corresponding to a route of travel through the physical region, generating with the processor and a display device a graphical rendering of the 3D virtual environment and the route with a height of the route being increased in regions of the 3D virtual environment where one or more of the plurality of 3D objects occludes a view of route, rendering of the route with partial transparency to provide visibility of objects occluded by the route and/or with navigation information, e.g. animated direction arrow, street names.

4 Claims, 3 Drawing Sheets

(56) References Cited

U.S. PATENT DOCUMENTS

2013/0131978 A1\* 5/2013 Han .................. G01C 21/3638
            701/436
2013/0317738 A1 11/2013 Ren et al.
2015/0178985 A1\* 6/2015 Di Censo ................ G06T 17/05
            345/419

\* cited by examiner

OCCLUSION-REDUCED 3D ROUTING FOR 3D CITY MAPS

CLAIM OF PRIORITY

This application claims priority to U.S. Provisional Application No. 62/042,276, which is entitled "Occlusion-Reduced 3D Routing For 3D City Maps," and was filed on Aug. 27, 2014, the entire contents of which are hereby incorporated by reference herein.

FIELD

This disclosure relates generally to the field of driver information and driver assistance systems (also known as in-vehicle information systems) and, more specifically, to systems and methods that provide graphical displays to a vehicle operator for mapping and navigation applications.

BACKGROUND

Modern motor vehicles often include one or more driver information and driver assistance systems (hereinafter referred to as in-vehicle information systems) that provide a wide variety of information and entertainment options to occupants in the vehicle. Common services that are provided by the in-vehicle information systems include, but are not limited to, vehicle state and diagnostic information, mapping and navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

Three-dimensional (3D) graphics methods have been widely used in different driver assistance and driver information applications. One typical example is navigation systems based on 3D maps. 3D maps depict visualizations of the real world scenes that include depictions of the height and structure of terrain and objects in a realistic manner so that the driver could attempt to match the synthetic appearances of rendered 3D objects in the map with those of real-world 3D objects that he observes through the wind shield. Compared with traditional two-dimensional (2D) maps, 3D maps are considered to be more helpful for easy driver orientation and fast location recognition. For example, 3D mapping and navigation services are provided by multiple online and offline services including services offered by Apple, Google, and Nokia.

However, 3D graphics in mapping and navigation applications can include a drawback when a driver wishes to review a route that is drawn on the map. The route graphic typically follows a path along one or more roads or trails, which are located at ground level in many routes. The presence of 3D objects around the route, such as graphical objects corresponding to 3D buildings, terrain, or other features, can block the route at various viewing angles in the 3D virtual environment. Existing techniques to improve the visibility of the 3D navigation route either require the operator to reorient the 3D view to avoid occluding objects, or remove the 3D objects or apply partial transparency to the 3D objects to provide a view of the route. These techniques reduce the level of realism in the 3D environment. Consequently, improvements to 3D visualization techniques for in-vehicle information systems that improve the visibility of navigation routes in the presence of occluding 3D objects would be beneficial.

SUMMARY

In one embodiment, a method for rendering a route in a 3D virtual environment includes generating with a processor a 3D virtual environment including a plurality of 3D objects, the 3D virtual environment corresponding to a physical region, identifying with the processor a route for navigation through the 3D virtual environment corresponding to a route of travel through the physical region, generating with the processor and a display device a graphical rendering of the 3D virtual environment and the route with a height of the route being increased in regions of the 3D virtual environment where one or more of the plurality of 3D objects occludes a view of route.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "in-vehicle information system" refers to a computerized system that is associated with a vehicle for the delivery of information to an operator and other occupants of the vehicle. An in-vehicle information system is also referred to as a driver assistance system or driver information system. In motor vehicles, the in-vehicle information system is often physically integrated with the vehicle and is configured to receive data from various sensors and control systems in the vehicle. In particular, some in-vehicle information systems receive data from navigation systems including satellite-based global positioning systems and other positioning systems such as cell-tower positioning systems and inertial navigation systems. Some in-vehicle information system embodiments also include integrated network devices, such as wireless local area network (LAN) and wide-area network (WAN) devices, which enable the in-vehicle information system to send and receive data using data networks. Data may also come from local data storage device. In an alternative embodiment, a mobile electronic device provides some or all of the functionality of an in-vehicle information system. Examples of mobile electronic devices include smartphones, tablets, notebook computers, handheld GPS navigation devices, and any portable electronic computing device that is configured to perform mapping and navigation functions. The mobile electronic device optionally integrates with an existing in-vehicle information system in a vehicle, or acts as an in-vehicle information system in vehicles that lack built-in navigation capabilities including older motor vehicles, motorcycles, aircraft, watercraft, and many other vehicles including, but not limited to, bicycles and other non-motorized vehicles.

Figure 1:
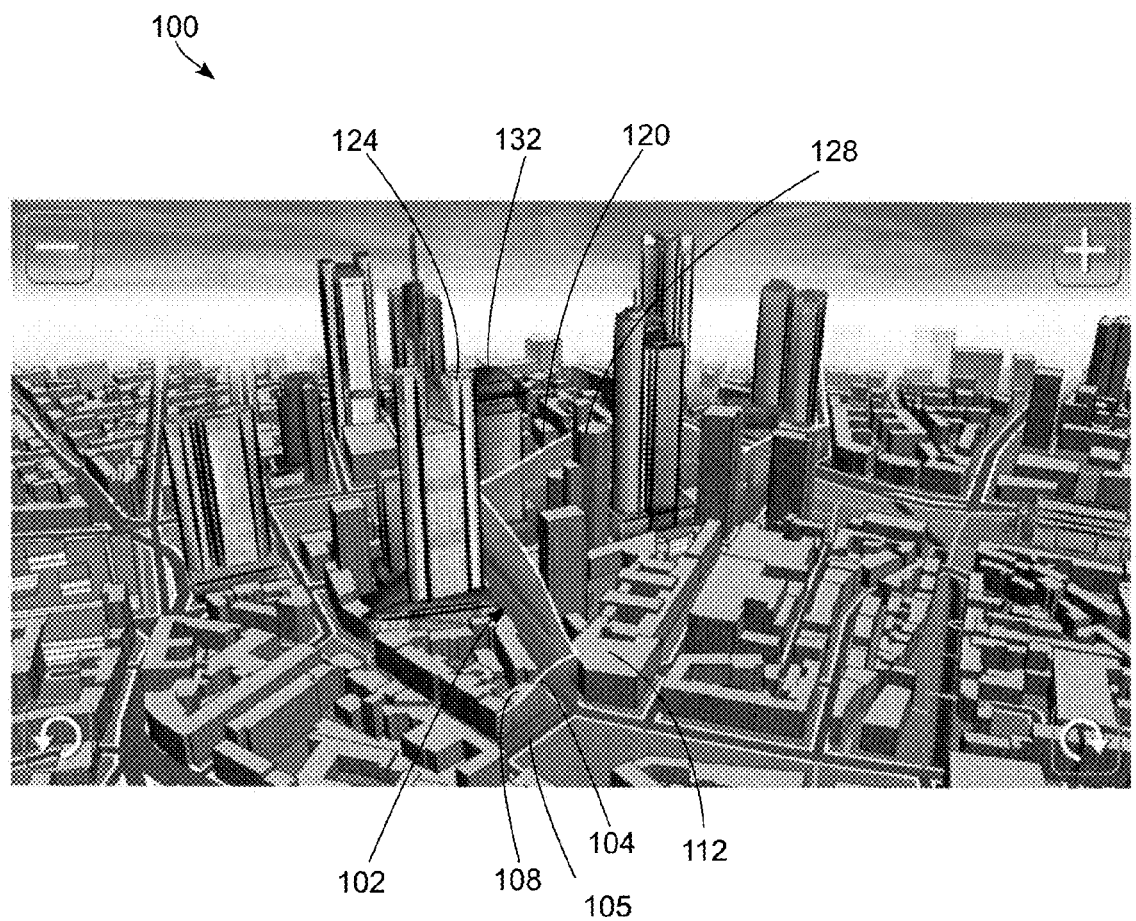
FIG. 1 is a depiction of a graphical display of a 3D virtual environment with a route graphic that extends to a height above ground level in the 3D virtual environment to provide visibility of the route in the presence of 3D objects surrounding the route.

FIG. 1 depicts a graphical display 100 of a 3D virtual environment that corresponds to a physical region, such as a city or other geographic region on the earth. The display 100 includes a graphical depiction of terrain, such as the surface of the earth under a city, one or more streets, such as the street 105, 3D objects in the virtual environment such as the buildings 108, 112, 124, 128, and 132, and a graphical depiction of the route 102. The display 100 depicts a rendering of the route 102 with a height that extends upward from the surface of the ground and underlying streets that form the route in the physical environment. For example, the street 105 lies along a section 104 of the route 102, but the route section 104 is rendered with an increased height to improve visibility of the route 102 near the buildings 108 and 112 that would otherwise occlude sections of the route 102 in the section 104. As used herein, the term "occlude" in regards to the display of a route refers to both a situation where a 3D object directly blocks display of the route on a surface of the virtual environment, such as the surface of a road in the virtual environment, and to a situation where a 3D object does not directly block display of the route but where the height of the route can be adjusted to improve visibility of the route. For example, in FIG. 1 the building 108 does not fully block display of the street 105 or route section 104, but the display 100 still depicts the route section 104 with an elevated height to improve the visibility of the route section 104 near the building 108.

In FIG. 1, the route 102 includes multiple sections including the section 104 with a first height that is depicted with a height that corresponds to the average height of the occluding building objects 108 and 112. In another section 120 of the route 102 the height of the route 102 increases to a greater height than the section 104 to correspond to the average height of taller building object such as the buildings 124 and 128. As depicted in FIG. 1, the graphical representation of the route 102 is partially transparent to provide visibility of objects that are fully or partially occluded by the route 102, such as the buildings 108 and 132.

Figure 2:
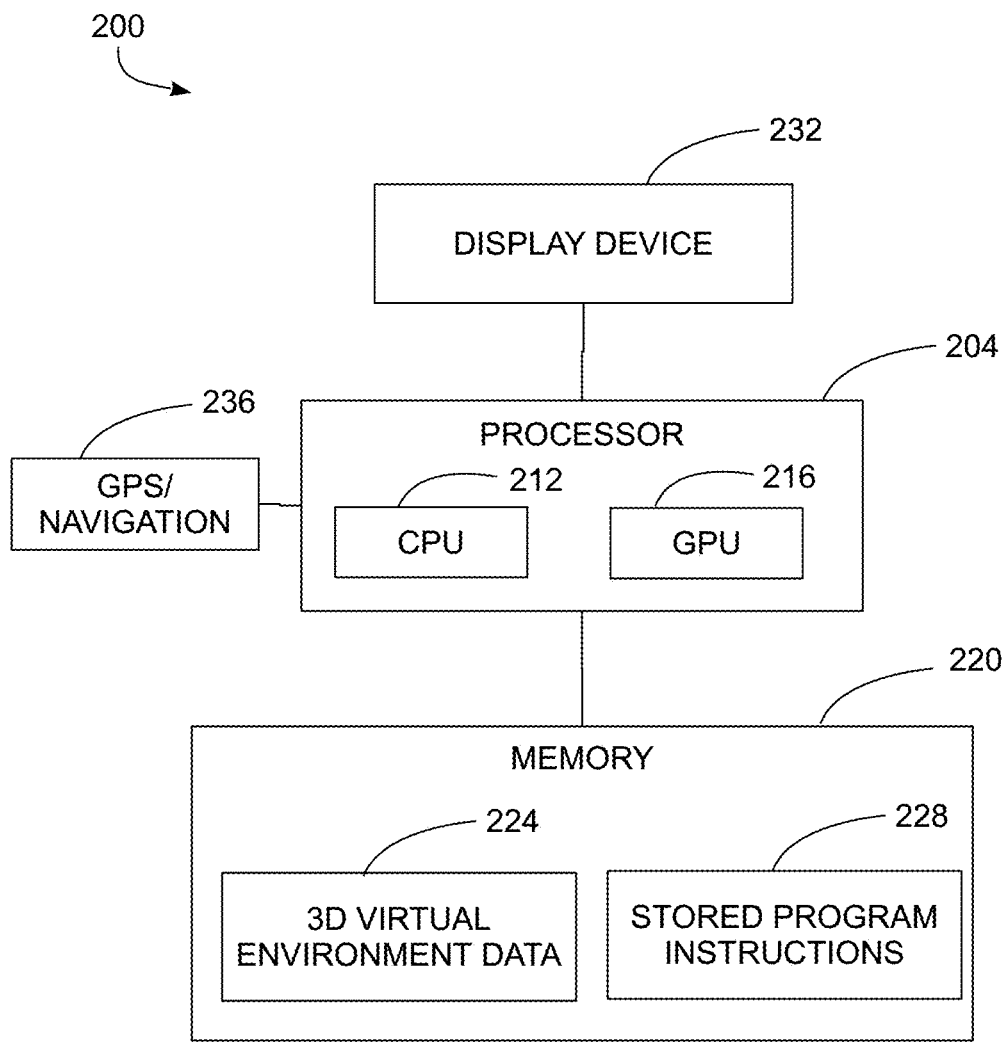
FIG. 2 is a block diagram of an illustrative embodiment of a computing device that generates the graphics of FIG. 1.

FIG. 2 depicts an in-vehicle information system 200 that generates a graphical display of a 3D virtual environment including a representation of a route, such as a route followed by a motor vehicle or other type of vehicle. The in-vehicle information system 200 includes a processor 204, memory 220, display 232, and optional positioning system 236. Hardware embodiments of the in-vehicle information system 200 include, but are not limited to, personal computer (PC) hardware, embedded system hardware including embedded computing hardware for use in a motor vehicle. While FIG. 2 depicts an in-vehicle information system, in an alternative embodiment the components in the system 200 are incorporated in a mobile electronic device such as a smartphone, tablet, wearable, or other portable computing device.

In the in-vehicle information system 200, the processor 204 includes one or more integrated circuits that implement the functionality of a central processing unit (CPU) 212 and graphics processing unit (GPU) 216. In some embodiments, the processor is a system on a chip (SoC) that integrates the functionality of the CPU 212 and GPU 216, and optionally other components including the memory 220 and positioning system 236, into a single integrated device. In one embodiment, the CPU is a commercially available central processing device that implements an instruction set such as one of the x86, ARM, Power, or MIPS instruction set families. The GPU includes hardware and software for display of both 2D and 3D graphics. In one embodiment, processor 204 executes software drivers and includes hardware functionality in the GPU 216 to generate 3D graphics using the OpenGL, OpenGL ES, or Direct3D graphics application programming interfaces (APIs). The GPU 216 includes one or more hardware execution units that implement various fixed-function and programmable processing elements including, for example, fragment shaders, geometry shaders, tessellation shaders, vertex shaders, and texture units for the processing and display of 2D and 3D graphics. During operation, the CPU 212 and GPU 216 execute stored programmed instructions 228 that are retrieved from the memory 220. In one embodiment, the stored programmed instructions 228 include operating system software and one or more software application programs that generate 3D graphics, including mapping and navigation applications.

The memory 220 includes both non-volatile memory and volatile memory. The non-volatile memory includes solid-state memories, such as NAND flash memory, magnetic and optical storage media, or any other suitable data storage device that retains data when the in-vehicle information system 200 is deactivated or loses electrical power. The volatile memory includes static and dynamic random access memory (RAM) that stores software and data, including graphics data and map feature data, during operation of the in-vehicle information system 200. The memory 220 also stores 3D virtual environment data 224 that includes graphical data to enable the in-vehicle information system 200 to generate 3D graphics corresponding to terrain, roads, routes, 3D objects including static buildings and moving objects such as the vehicle, and optionally other graphical effects including lighting and weather effects.

The in-vehicle information system 200 includes an optional positioning system device 236 that is operatively connected to the processor 204. Examples of positioning systems include global positioning system (GPS) receivers, radio triangulation receivers that identify a location of the in-vehicle information system 200 with respect to fixed wireless transmitters, and inertial navigation systems. During operation, the processor 204 executes mapping and navigation software applications that retrieve location information from the positioning system 236 to identify a geographic location of the in-vehicle information system 200 and to adjust the display of the virtual environment to correspond to the location of the in-vehicle information system 200. In navigation applications, the processor 204 identifies the location and movement of the in-vehicle information system 200 for the generation of routes to selected destinations and display of the routes in the 3D virtual environment.

In the in-vehicle information system 200, the display 232 is either an integrated display device, such as an LCD or other display device, which is integrated with a housing of the in-vehicle information system 200, or the display 232 is an external display device that is operatively connected to the in-vehicle information system 200 through a wired or wireless interface to receive output signals from the processor 204 to generate a display of the 3D virtual environment and the enhanced route graphics. In an embodiment where the in-vehicle information system 200 is an in-vehicle embedded computing device, the display 232 is an LCD or other flat panel display that is located in the console of a vehicle, or the display 232 is a head-up display (HUD) or other projection display that displays the 3D virtual environment on a windshield or other display surface in the vehicle.

Figure 3:
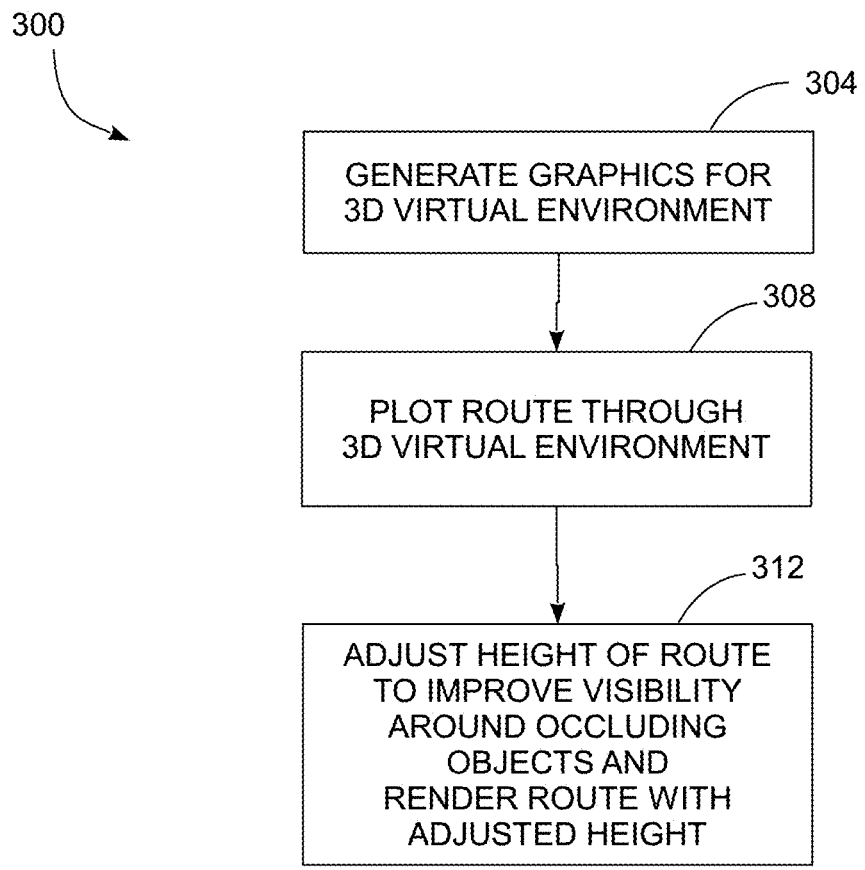
FIG. 3 is a diagram of a process for generating the 3D virtual environment with a navigation route that is rendered with a height that improves the visibility of the route around occluding objects in the 3D virtual environment.

FIG. 3 depicts a diagram of a process 300 for generating a graphical rendering depicted in FIG. 1. In the discussion below, a reference to the process 300 performing a function or action refers to the operation of a processor executing stored program instructions to perform the function or action. The process 300 is described in conjunction to the display of FIG. 1 and the in-vehicle information system 200 of FIG. 2 for illustrative purposes.

The process 300 begins as the process 204 generates graphics corresponding to a 3D virtual environment (block 304). In the system 200, the CPU 212 and GPU 216 execute the stored instructions 228 for a navigation application that processes the 3D virtual environment data 224 to generate a 3D virtual environment, such as the environment that is depicted in FIG. 1. During operation, the processor 204 plots a route through the 3D virtual environment for navigation of the vehicle (block 308). The plotted route typically follows one or more roads, trails, or other predetermined routes that are used for navigation.

As depicted in FIG. 1, the route may pass terrain or other objects in the 3D virtual environment that occlude the view of the route. To improve the visibility of the route, the processor 204 increases the height of the route above the surface of the terrain and renders the 3D route where the vehicle travels to enable the vehicle operator to view the route in the presence of one or more occluding objects (block 312). In one embodiment, the CPU 212 in the processor 204 generates a triangular strip rising from the ground to different points along the route to form a piecewise linear display. The processor 204 selects key points for each segment along the route 102 in a uniform manner and the heights of each segment are depicted as a flat or angled line. In another embodiment, the CPU 212 uses B-spline or other curves to form the top of the route as a smooth curve instead of linear segments.

In one embodiment, the processor 204 increases the heights of different sections of the route in a dynamic manner based on the presence and height of occluding objects around the different sections of the route. For example, in one embodiment the processor 204 identifies the average height of all occluding objects that are within a predetermined distance of each section of the route, and adjusts the height of the route to either match or exceed the average height of the occluding objects. In one configuration, the processor 204 identifies the average height of the route based on a weighted average of the heights of the surrounding objects where the weighting value that is assigned to each object is inversely related to the distance between the object and the route 102. For example, the height of the building 128 has a higher weight value for identifying the height of the route section 120 compared to the route section 104 because the building 128 is closer to the route section 120 than the route section 104. The graphical depiction of the route is optionally rendered with partial transparency to provide visibility to objects that are occluded by the route after the processor 204 adjusts the height of the route. Additionally, the processor 204 optionally maps dynamic textures such as moving arrows to the surface of the route 102 to provide a dynamic indication of the intended direction of travel along the route 102. In FIG. 1, the route 102 includes multiple sections including the section 104 with a first height that the processor 204 generates with a height that corresponds to the average height of the occluding building objects 108 and 112. In the section 120 of the route 102, the processor 204 increases the height of the route 102 to a greater height than the section 104 to correspond to the average height of taller building object such as the buildings 124, 128, and 132. As depicted in FIG. 1, the graphical representation of the route 102 is partially transparent to provide visibility of objects that are fully or partially occluded by the route 102, such as the buildings 108 and 132.

While the illustrative embodiment of the process 300 includes adjustment of the height of the route based on the height of objects that occlude different sections of the route, in alternative embodiments the route height is set to a single level for the entire length of the route or individual sections of the route are adjusted to a height that is higher than any object that occludes the route. In some embodiments of navigation systems that enable the operator to adjust a point of view for the 3D virtual environment, the processor 204 is further configured to modify the height of the route display when the new point of view adds, removes, or adjusts the relative heights of objects that occlude the route in the 3D virtual environment.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

The invention claimed is:

1. A method for rendering a route in a 3D virtual environment comprising:
    generating with a processor a 3D virtual environment including a plurality of 3D objects, the 3D virtual environment corresponding to a physical region;
    identifying with the processor a route for navigation through the 3D virtual environment corresponding to a route of travel through the physical region;
    generating with the processor and a display device a graphical rendering of the 3D virtual environment and the 3D route with a height of the route being increased in regions of the 3D virtual environment where one or more of the plurality of 3D objects occludes a view of route.

2. The method of claim 1, the generation of the graphical rendering of the 3D virtual environment further comprising:
    increasing with the processor the height of a section of the route corresponding to an average height of at least one object in the 3D virtual environment that within a predetermined distance to the section of the route.

3. The method of claim 1, the generation of the graphical rendering of the 3D virtual environment further comprising:
    rendering with the processor the 3D route with partial transparency to provide visibility to at least one object in the 3D virtual environment that is occluded by the route.

4. The method of claim 1, the generation of the graphical rendering of the 3D virtual environment further comprising:

rendering with the processor the 3D route integrated with navigation information, e.g. animated direction arrow, street names.

\* \* \* \* \*